US008206540B2

(12) United States Patent
Evans

(10) Patent No.: US 8,206,540 B2
(45) Date of Patent: Jun. 26, 2012

(54) BACKING FILM AND METHOD FOR PLY MATERIALS

(75) Inventor: Richard B. Evans, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/528,353

(22) Filed: Sep. 28, 2006

(65) Prior Publication Data

US 2007/0017628 A1    Jan. 25, 2007

Related U.S. Application Data

(62) Division of application No. 10/829,270, filed on Apr. 22, 2004, now abandoned.

(51) Int. Cl.
  *B32B 37/14* (2006.01)
  *B32B 38/10* (2006.01)
  *B29C 65/48* (2006.01)
(52) U.S. Cl. ......... 156/247; 156/248; 156/250; 156/256
(58) Field of Classification Search .................. 156/247, 156/248, 250, 256
  See application file for complete search history.

(56) References Cited

U.S. PATENT DOCUMENTS

| | | | |
|---|---|---|---|
| 3,775,219 A * | 11/1973 | Karlson et al. ................. | 156/363 |
| 3,971,866 A | 7/1976 | Johnson | |
| 4,029,838 A | 6/1977 | Chamis et al. | |
| 4,252,592 A * | 2/1981 | Green ........................ | 156/273.3 |
| 4,319,750 A | 3/1982 | Roy | |
| 4,588,466 A * | 5/1986 | Eaton ............................. | 156/235 |
| 4,637,943 A * | 1/1987 | Bennett ........................ | 428/34.1 |
| 4,683,018 A | 7/1987 | Sutcliffe et al. | |
| 4,861,406 A * | 8/1989 | Baker et al. .................... | 156/230 |
| 4,867,834 A | 9/1989 | Alenskis et al. | |
| 4,876,153 A | 10/1989 | Thorfinnson | |
| 4,938,824 A | 7/1990 | Youngkeit | |
| 4,990,213 A * | 2/1991 | Brown et al. .................. | 156/425 |
| 5,043,032 A | 8/1991 | Hunter et al. | |
| 5,117,348 A * | 5/1992 | Romero et al. .................. | 700/57 |
| 5,173,138 A | 12/1992 | Blauch et al. | |
| 5,496,602 A | 3/1996 | Wai | |
| 5,589,115 A | 12/1996 | Sherwood | |
| 5,667,889 A | 9/1997 | Katsura et al. | |
| 5,700,347 A * | 12/1997 | McCowin ...................... | 156/425 |
| 5,709,957 A * | 1/1998 | Chiang et al. ................. | 428/615 |
| 5,866,272 A | 2/1999 | Westre et al. | |
| 6,013,376 A | 1/2000 | Yenni, Jr. | |
| 6,133,167 A | 10/2000 | Green et al. | |
| 6,163,957 A | 12/2000 | Jiang et al. | |
| 6,242,090 B1 | 6/2001 | Green et al. | |
| 6,523,258 B2 | 2/2003 | Kawamoto et al. | |
| 6,596,391 B2 * | 7/2003 | Smith ........................... | 428/344 |
| 6,692,681 B1 * | 2/2004 | Lunde ........................... | 264/510 |

FOREIGN PATENT DOCUMENTS

JP    2001-225418 A    8/2001

* cited by examiner

*Primary Examiner* — Mark A Osele
*Assistant Examiner* — Christopher C Caillouet

(57) ABSTRACT

A layered material includes a ply material and a backing film to support the ply material. The backing film includes a polyester film. The layered material is generated by disposing the backing film upon the ply material. A composite layup is generated by tacking the layered material to a tool, disposing the layered material upon the tool along a path, and removing the backing film.

13 Claims, 5 Drawing Sheets

BACKING FILM AND METHOD FOR PLY MATERIALS

CROSS-REFERENCE TO RELATED APPLICATIONS

This application claims priority to and is a divisional of U.S. patent application entitled, BACKING FILM AND METHOD FOR PLY MATERIALS, filed Apr. 22, 2004, having a Ser. No. 10/829,270, now abandoned the disclosure of which is hereby incorporated by reference in its entirety.

FIELD OF THE INVENTION

The present invention generally relates to backing materials for sheet and roll stock. More particularly, the present invention pertains to an improved backing material for pre-impregnated ply material.

BACKGROUND OF THE INVENTION

Composite structures are typically constructed from multiple layers or plies. These plies may include a variety of materials such as carbon fiber, various other fibers, metal foils, and the like. In addition, the plies may be pre-impregnated with a resin and are often dispensed from a roll or spool. In roll form, the ply material is referred to as "tape" and typically includes a paper backing film. This backing film generally prevents pre-impregnated ply material (prepreg) from adhering to itself and aids in handling the ply as the ply is applied to the tool and the layup. In particular, at the beginning and end of each ply placement, the ply material is generally cut to match the profile of the layup while the backing film is left intact. In this manner, the intact backing film is utilized to guide the severed ply on to the layup. During the layup process, the backing film is removed prior to placement of any subsequent ply.

A disadvantage associated with conventional backing film material is that the backing film rips or tears. In particular, cuts in the backing film, introduced during the ply cutting procedure, often serve as a starting point for a tear. As the backing film is removed, torn backing film may remain on the ply, may foul the ply placement head, and/or may lead to breakage of the backing film.

Another disadvantage associated with conventional backing film is that it is usually a relatively thick calendered claycote type paper. The weight and thickness of this paper reduce the yardage of ply material that may be placed on a spool of a given diameter. Reducing the thickness of the conventional backing film in an effort to place more backed ply material on a spool, however, increases the tendency of the backing film to tear.

Yet another disadvantage associated with conventional backings films is the opaque nature of the paper. This opacity precludes visual inspection of the ply placement until the backing film is removed. Once the backing film is removed from the ply, the handling characteristics of the ply are negatively impacted so, it is difficult or impossible to adjust the ply placement.

Accordingly, it is desirable to provide a backing film for pre-impregnated ply material that is capable of overcoming the disadvantages described herein at least to some extent.

SUMMARY OF THE INVENTION

The foregoing needs are met, to a great extent, by the present invention, wherein in some embodiments an improved backing film for pre-impregnated ply material is provided.

An embodiment of the present invention relates to a layered material. The layered material includes a ply material and a backing film disposed upon the ply material. The backing film includes a polyester film.

Another embodiment of the present invention pertains to an apparatus for generating backed ply material. The apparatus includes a means for disposing a polyester film upon a ply material and a means for generating a roll of the backed ply material by wrapping the backed ply material about a spool.

Yet another embodiment of the present invention relates to an apparatus for generating a composite layup. The apparatus includes a means for tacking a ply material having a polyester backing film to a tool. The apparatus further includes a means for disposing the ply material upon the tool along a path and a means for removing the polyester backing film.

Yet another embodiment of the present invention pertains to a method of generating a backed ply material. In this method, a polyester film is disposed upon a ply material.

Yet another embodiment of the present invention relates to a method of generating a composite layup. In this method, a ply material having a polyester backing film is tacked to a tool, the ply material is disposed upon the tool along a path, and the polyester backing film is removed.

There has thus been outlined, rather broadly, certain embodiments of the invention in order that the detailed description thereofherein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
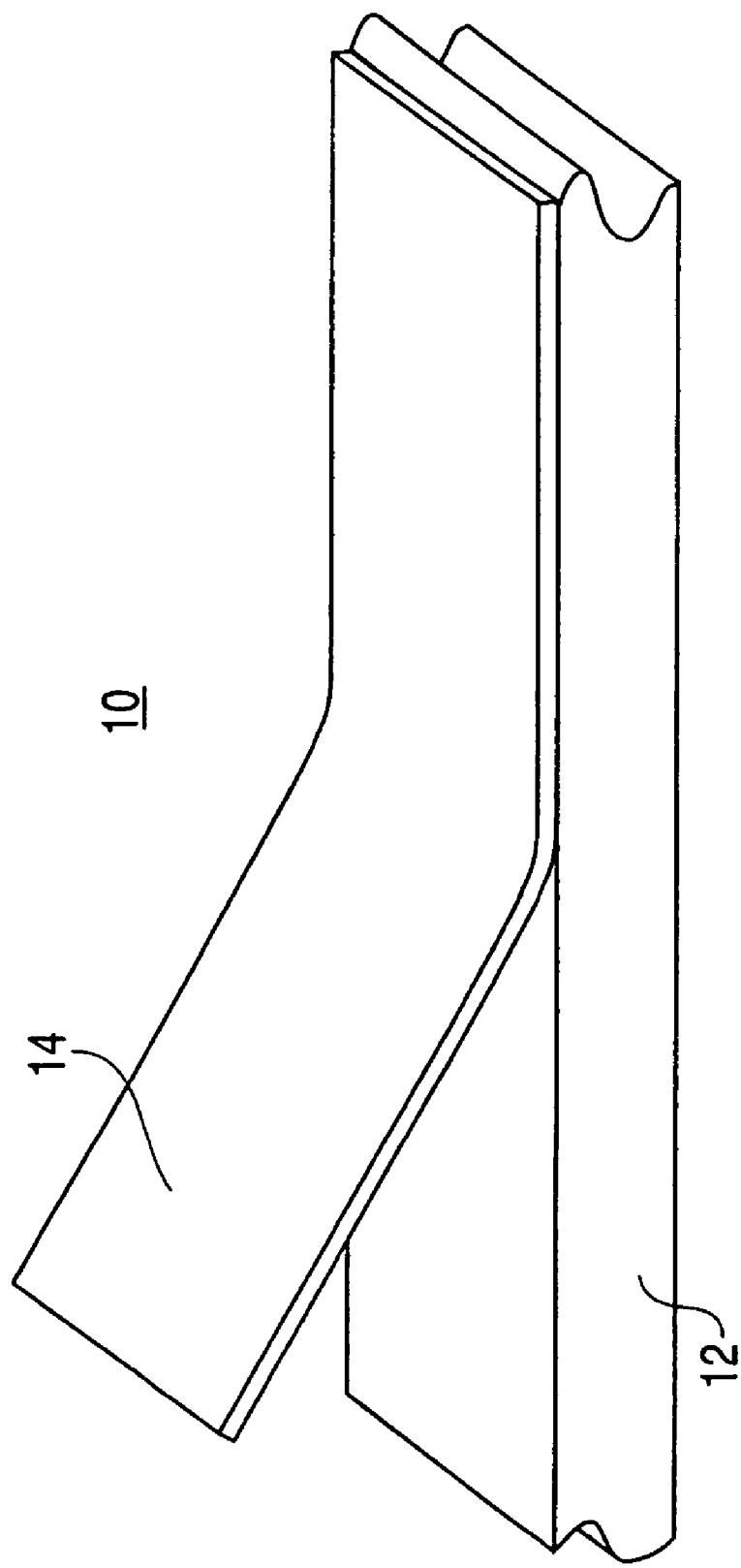
FIG. 1 is perspective view of ply material according to an embodiment of the invention.

The present invention provides, in some embodiments, a backing material, a backed composite ply material, and a method of generating a backed ply material. An embodiment of the invention will now be described with reference to the drawing figures, in which like reference numerals refer to like parts throughout. As shown in FIG. 1, a backed ply material 10 includes a ply material 12 and a backing 14. In various embodiments of the invention, the ply material 12 may include any suitable sheet stock. Examples of suitable sheet stocks include: woven fiber fabric; oriented strand tape; metal foil such as aluminum alloy and titanium foil; composite materials such as titanium graphite composites; and the like. In a particular embodiment, the ply material 12 is a graphite fiber tape pre-impregnated with an epoxy resin (pre-preg). In another particular embodiment, the ply material 12 is an epoxy resin coated titanium foil.

In general, the backing 14 lends support to the ply material 12 and aids in handling the ply material 12. As described herein, the backed ply material 10 is typically rolled on to a spool in preparation for dispensing. For a given thickness of the ply material 12 rolled into a given diameter spool, the thickness of the backing 14 has an inversely proportional relationship with the length of ply material 12 that may be placed on the spool. That is, the thinner the backing 14, the more ply material 12 will fit onto the spool. Longer lengths of ply material 12 are generally preferred due to the decreased number of splices that must be prepared, reduced downtime as a result of the decreased number of splices, and reduced number of spool change operation to be performed. Thus, it is preferable that the backing 12 is thin. In addition, the thickness of this backing 14 is varied depending upon the particular application. For example, according to various embodiments of the invention, for typical composite layup applications, the thickness of the backing 14 is from about 0.001 inches (1 mil) to about 0.004 inches (4 mil). More preferably, the thickness of the backing 14 is about 1 mil to about 2 mil. However, in other embodiments, the thickness of the backing 14 is less than 1 mil. For example, when constructing relatively small and/or convoluted items such as, hand held or smaller devices, it may be advantageous that the ply material 12 be approximately 1 mil thick or less and the backing 14 be approximately 0.1 mil thick or less. In yet other embodiments, the thickness of the backing 14 is greater than 4 mil. For example, when constructing items with relatively thick (3 millimeters or more) or otherwise difficult to handle ply material 12, the backing 14 may be 10 or more mil thick.

During layup operations, the backing 14 is typically removed. To reduce down time, it is also preferable that the backing 14 is tear-resistant. For example, the backing 14 may include a polymeric or otherwise tough resilient material. According to an embodiment of the invention, the backing 14 includes a suitable polyester film. Suitable polyester films include at least polyethylene terephthalate (PET) and heat stabilized PET. In this regard, when applying heat during layup operations, it may be advantageous to utilize a heat stabilized PET. To further facilitate removal of the backing 14 from the ply material 12, the backing 14 optionally includes a suitable release agent. Suitable release agents include at least silicone release agents applied by Tribex Corp. of Rocklin Calif., USA. Optionally, the backing 14 is substantially transparent to facilitate inspection of seams between abutting plies. For example, a 2 mil film of PET is essentially transparent.

Figure 2:
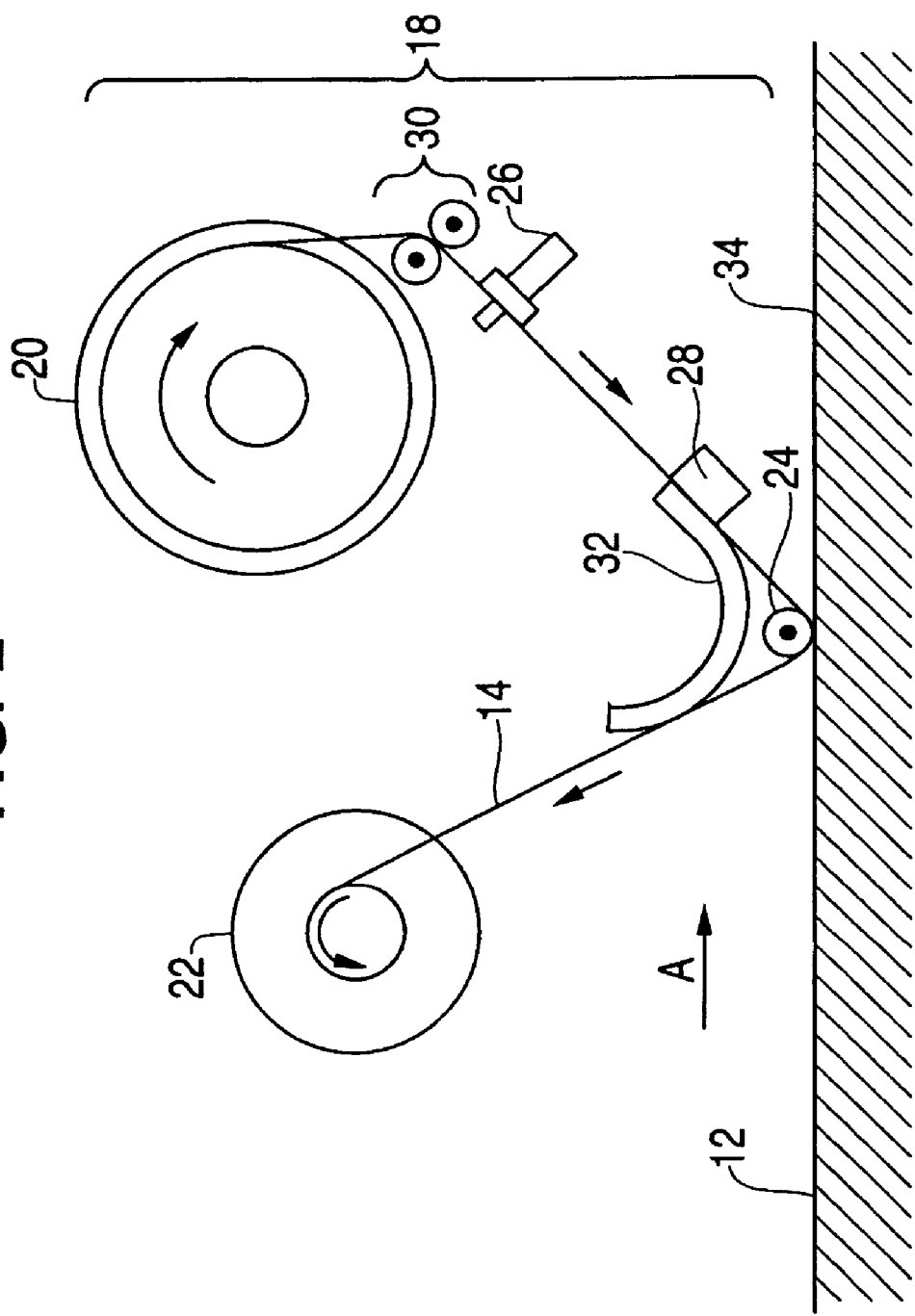
FIG. 2 is a simplified side view of a tape laying head suitable for use with the ply material according to FIG. 1.

FIG. 2 is a simplified side view of a tape laying head 18 suitable for use with the backed ply material 10 according to FIG. 1. As shown in FIG. 2, the tape laying head 18 includes a supply spool 20, take-up reel 22, a shoe or compaction roller 24, cutting assembly 26, heater assembly 28, material feeder 30, and guide chute 32. The tape laying head 18 dispenses the ply material 12 upon a tool 34 as it moves in direction A relative to the tool 34. More particularly, the supply spool 20 and the take-up reel 22 rotate in the respectively indicated directions to cause backed ply material 10 to advance through the tape laying head 18 as indicated. The supply spool 20 and/or the take-up reel 22 are optionally controlled to rotate via the action of, for example, one or more servo axis motors. Following application of the ply material 12 upon the tool 34, the backing 14 is removed and collected by, for example, the take-up reel 22. However, the take-up reel 22 is optional and thus, the backing 14 may be removed in any suitable manner such as, for example, manually, a backing removal device, or the like. Depending upon the particular application, the placement of the ply material 12 may be inspected prior to removal of the backing 14. In this regard, it is an advantage of some embodiments of the invention that the backing 14 is substantially transparent and thus, the placement of the ply material 14 may be plainly visible through the backing 14.

The cutting assembly 26 may employ any known cutting device such as various bladed devices, abrasive cutters, high pressure jets, lasers, and the like. In a specific example, the cutting assembly 26 includes an ultrasonic knife that is caused to vibrate by an ultrasonic transducer and controlled to rotate by the action of a motor. The ultrasonic knife is further controlled to traverse the full width of the backed ply material 10 or any portion thereof by the action of a motor configured to rotate a jackscrew. Furthermore, the cutting assembly 26 may employ more than one cutting device. For example, the cutting assembly 26 of an embodiment of the invention includes two cutting devices controlled to perform cutting operations in a substantially simultaneous manner.

When utilizing specific materials and/or operating conditions in which heating of the material is advantageous, the heater assembly 28 is configured to impart thermal energy upon the backed ply material 10. In this regard, any known device operable to heat the backed ply material 10 in a suitable manner may be utilized by various embodiments of the invention. For example, the heater assembly 28 may include a diverter valve configured to control the flow of heated air directed onto the backed ply material 10. In addition, to the heater assembly 28, the tape laying head 18 may include various supplemental heaters such as, for example, a guide chute heater, a heater following the compactions roller 24, and the like.

Figure 3:
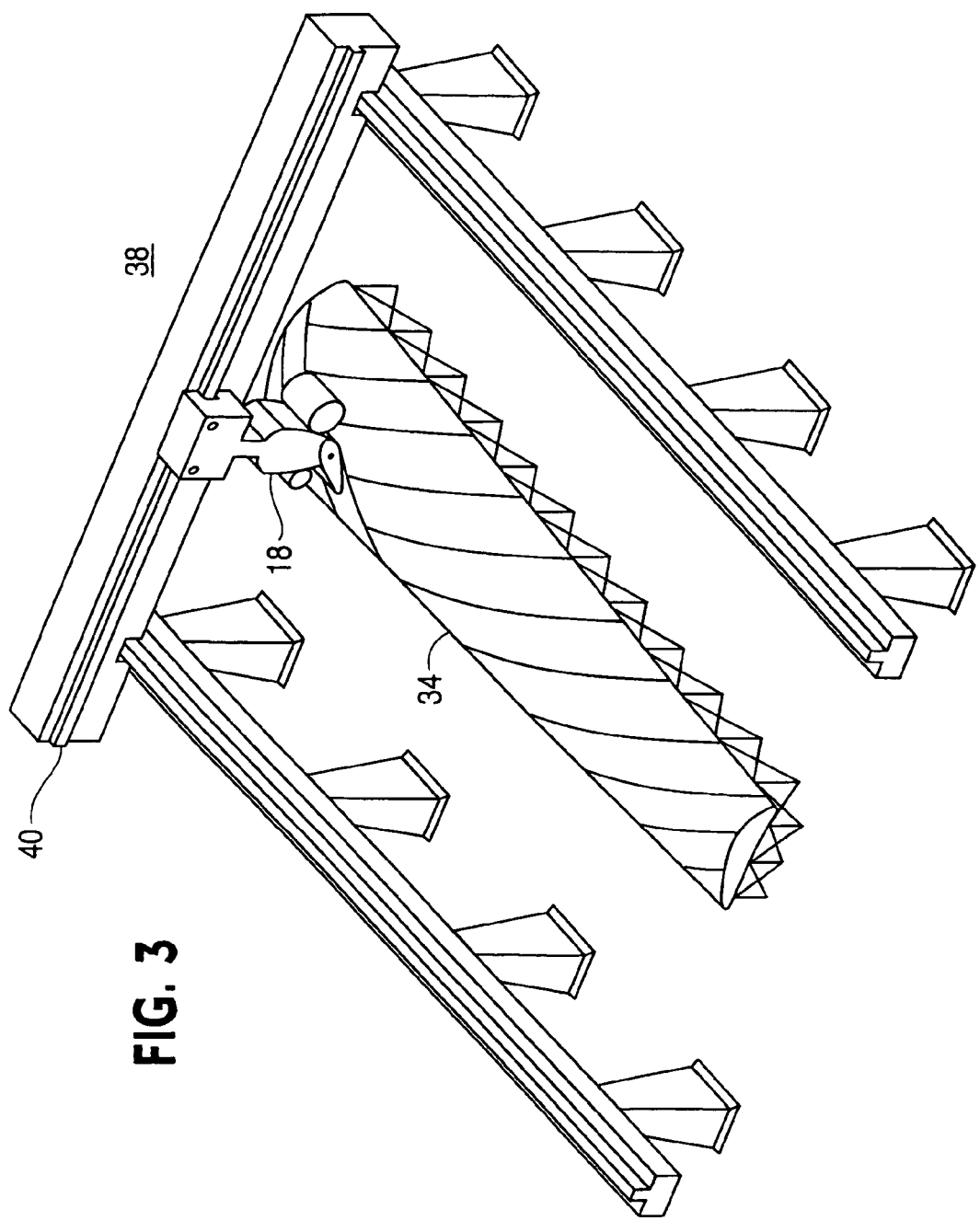
FIG. 3 is a perspective view of a contour tape lamination machine suitable for use with the ply material according to FIG. 1.

FIG. 3 is a perspective view of a contour tape lamination machine (CTLM) 38 suitable for use with the backed ply material 10 according to FIG. 1. As shown in FIG. 3, the CTLM 38 is of a gantry-type and, as such, includes a gantry 40, the tape laying head 18, and the tool 34. The gantry 40 is configured to control the movement of the tape laying head 18 in relation to the tool 34 and the ply material 12 laid upon the tool 34. In an embodiment of the invention, the gantry 40 is configured to control ten axes of movement (five axes of the gantry and five axes of the tape laying head 18). However, it is to be understood that the specific number of axes may depend upon the particular operating condition and thus, the number of axes controlled is not critical to the invention.

Figure 4:
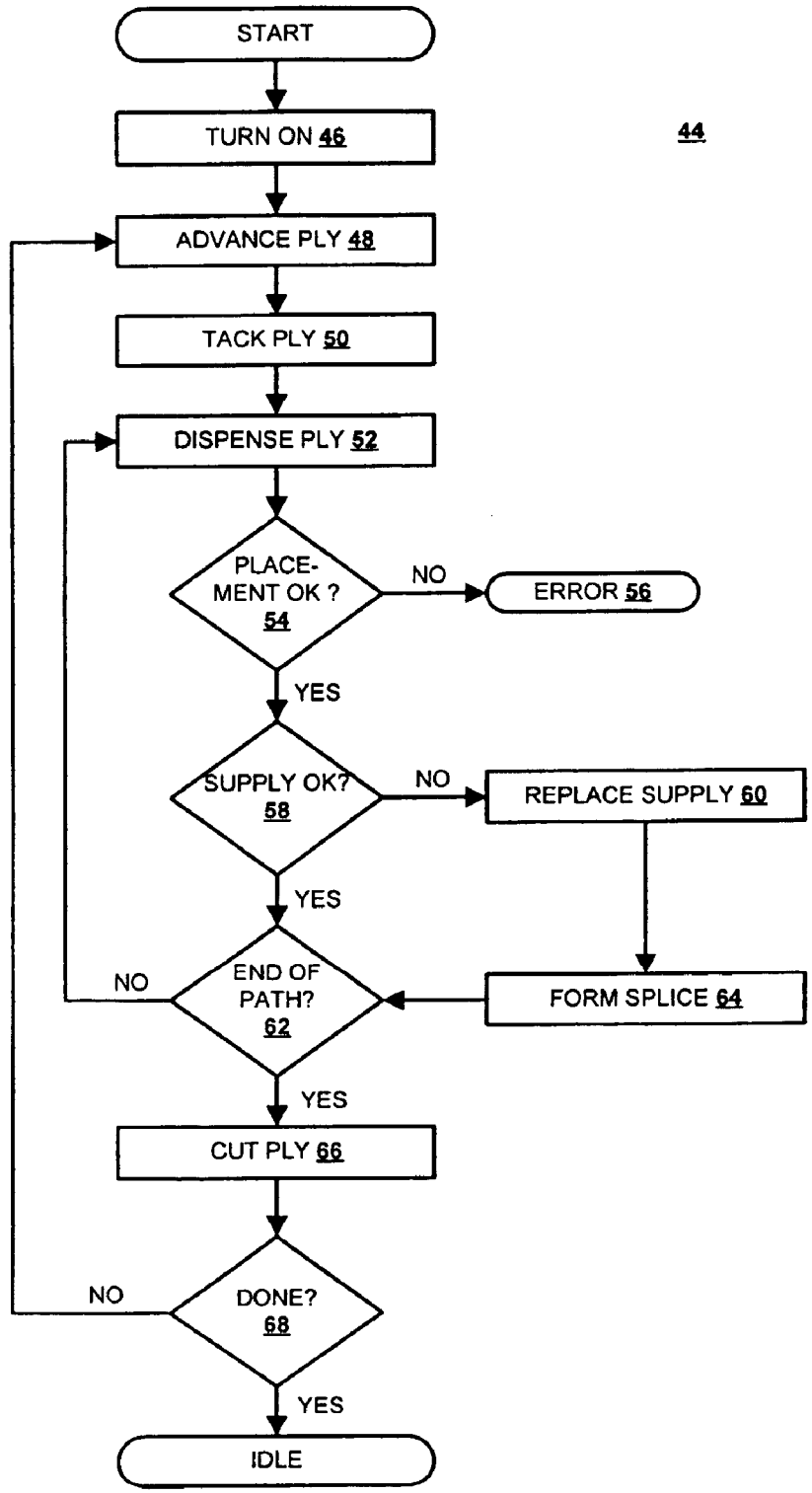
FIG. 4 is a flow diagram of a method of placing plies to produce a composite structure or product according to an embodiment of the invention.

FIG. 4 illustrates steps involved in a method 44 of placing plies to produce a composite structure or product. Prior to the initiation of the method 44, a composite product is designed and a series of computer readable instructions specifying attributes of the composite product is generated. These instructions are utilized to control the operations of the CTLM 38 and construct a form such as the tool 34. This form is further positioned within the operational area of the CTLM 38.

At step 46, the method 44 is initiated by turning on the various components of the CTLM 38 described herein above and executing the computer readable instructions.

At step 48, the backed ply material 10 is advanced to an initial point. For example, the take up reel 22 and/or the supply spool 20 may be controlled to advance the backing 14 through the tape laying head 18 until an end of the ply material 12 is positioned between the compaction roller 24 and the tool 34. In another example, the rollers of the material feeder 30 may engage the backed ply material 10 and advance the ply through the tape laying head 18 until the backed ply material 10 is positioned to be applied to the tool 34, referred to as being tacked. To ensure the backed ply material 10 has advanced a suitable amount, a sensor and/or operator may sense the position of the backed ply material 10. In addition, the location on the tool 34 is determined based upon the series of computer readable instruction and/or the location of a previously positioned ply material 12. Furthermore, prior to tacking the ply material 12 to the substrate at step 50, the end of the ply material 12 is, optionally, cut based upon the series of computer readable instruction, the orientation of a previously positioned ply material 12, and/or the location of a previously positioned ply material 12. In a particular example, cutting of the ply material 12 may be performed at a controlled depth of cut so as to substantially sever the ply material 12 while leaving the backing 14 substantially uncut.

At step 50, the backed ply material 10 is tacked to the substrate. In an embodiment of the invention, the backed ply material 10 is tacked by positioning the tape laying head 18 with the CTLM 38 such that the compaction roller 24 or a shoe is controlled to press the backed ply material 10 on to the substrate with sufficient force so as to cause the backed ply material 10 to adhere to the substrate.

At step 52, the backed ply material 10 is dispensed along a path across the tool 34. In order to minimize deformations in the backed ply material 10 (e.g., wrinkles), this path is typically calculated to coincide with a "natural path" based upon any contours in the tool 34. As the tape laying head 18 is controlled along the path across the tool 34, the compaction roller 24 is caused to exert sufficient pressure so as to adhere the ply material 12 to the tool 34. As the tape laying head 18 moves along the path, the backed ply material 10 is drawn out of the tape laying head 18 and consolidated on to the tool 34. In this regard, composite layups typically include multiple layers of ply material. Thus, in subsequent applications of the ply material 12, backed ply material 10 is dispensed upon previously applied ply material.

At step 54, the placement of the backed ply material 10 on the tool 34 is evaluated. For example, a sensor or an operator may sense the relative position of the backed ply material 10 and a previously positioned backed ply material 10 and determine if the distance between these plies is within a predetermined tolerance. If the distance between these plies is not within the predetermined tolerance, an error may be generated at step 56. If the distance between these plies is within the predetermined tolerance, it is determined if the supply is sufficient at step 58. In addition, in some embodiments of the invention, the backing 14 is removed from the backed ply material 10 following placement evaluation. However, the backing 14 need not be removed prior to step 58, but rather, the backing 14 may be removed at essentially any time prior to placement of a subsequent ply upon the backed ply material 10. Furthermore, it is an advantage of embodiments of the invention that the backing 14 is recyclable. That is, the backing 14 may be collected and submitted to a recycling facility where the PET constituent of the backing 14 may be processed to generate products. For the purpose of this disclosure, the term, "recycling" is defined as the act of collecting the backing 14 for submission to a recycling facility and/or the reprocessing of the backing 14.

At step 58, it is determined whether the supply of ply material is sufficient. For example, if it is determined that the supply spool 20 contains ply material then, it is determined if sufficient ply material remains. If it is determined that there is an insufficient amount of remaining ply material, the supply spool 20 is replaced at step 60. If it is determined that a sufficient amount of ply material remains then, it is determined if the end of the path has been reached at step 62.

At step 60 the supply spool 20 is replaced. For example, a spent supply spool 20 is removed from the tape laying head 18 and a substantially full supply spool 20 may be disposed within the tape laying head 18. Following replacement of the supply spool 20, a splice is optionally formed at step 64. For example, if the supply of ply material is exhausted during the placement of a ply, the ply material 12 for the uncompleted path may be removed or, optionally, spliced to the ply material 12 from the new supply spool 20. If the splice is performed, the particular steps performed is dependent upon the ply material utilized and the product being laid up. However, in general, the trailing edge of the uncompleted ply and the starting edge of the new ply material are cut to match. These cut edges are abutted and quality control procedure procedures are performed.

An advantage of embodiments of the invention over conventional backed ply material is that, due to the relative thinness of the backing 12, a relatively greater amount of ply material fits on the spool and thus, fewer spool change and tape splicing operations need be performed.

At step 62, it is determined if the end of the path has been reached. If, based on the series of computer readable instruction, it is determined the tape laying head 18 has not advanced to the end of the path, additional backed ply material 10 is dispensed at step 52. If, it is determined the tape laying head 18 has advanced to the end of the path, the backed ply material 10 is cut at step 66.

At step 66, the end of the ply material 12 may be cut based upon the series of computer readable instruction, the orientation of a previously positioned ply material 12, and/or the location of a previously positioned ply material 12.

At step 68, it is determined if the placement of the ply material 12 on the tool 34 has been completed. For example, if all of the computer readable instructions have been completed, it may be determined that the placement of plies for the composite product has been completed and the CTLM 38 may idle until another series of computer readable instructions is initiated. If is determined the placement of plies 12 for the composite product is not completed, an additional ply material 12 placement may proceed at step 48.

Following the method 44, the composite product may be cured in any suitable manner. In the aerospace industry, thermoset resins are generally utilized to pre-impregnate ply material. These thermoset resins are typically cured by being held at an elevated temperature for a predetermined amount of time. Times and temperatures may be selected depending on the resin used, the size and thickness of the composite product, and the like.

Although an example of the tape laying head 18 is shown utilizing the backed ply material 10 for composite products in the airline industry, the backed ply material 10 can also be used in other industries that construct composite product. These industries include, but are not limited to, automobile, marine, spacecraft, building, and consumer products.

Figure 5:
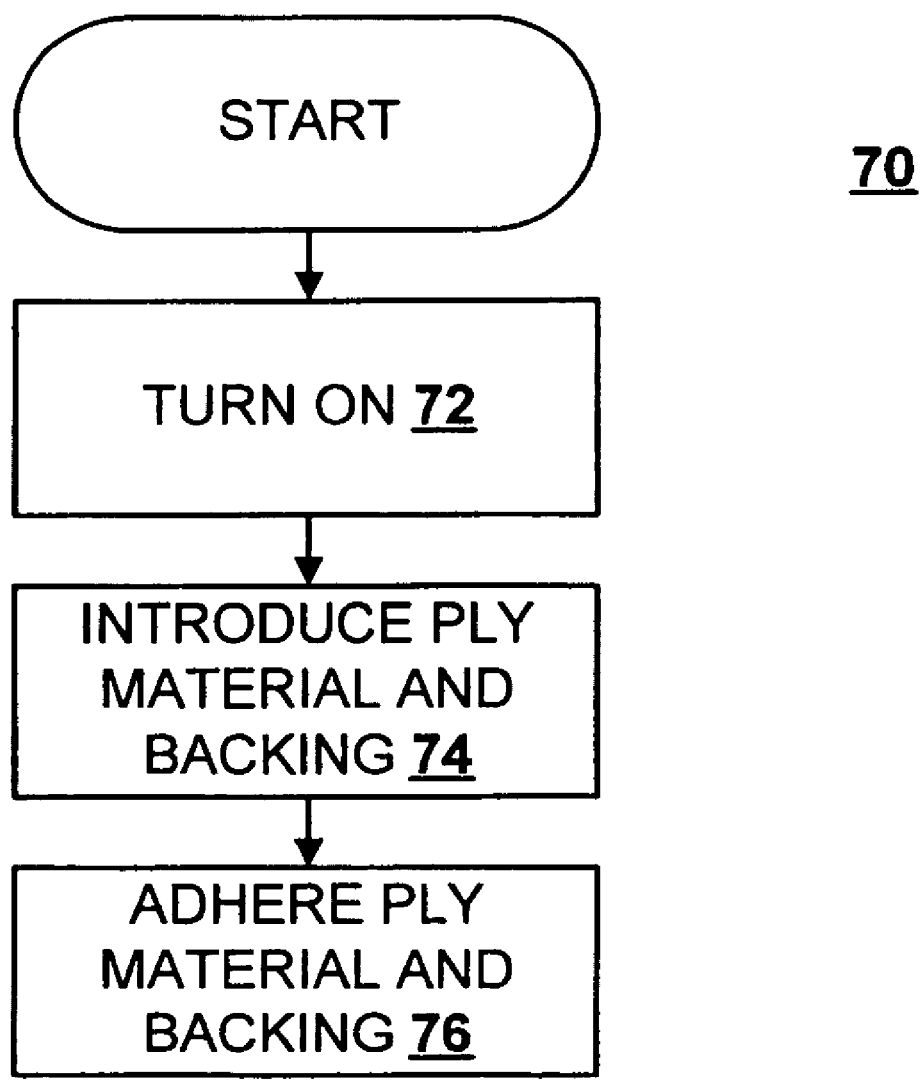
FIG. 5 is a flow diagram of a method to generate a backed ply material according to FIG. 1.

FIG. 5 is a flow diagram of steps performed in a method 70 to generate the backed ply material 10 according to FIG. 1. As shown in FIG. 5, the method 70 is initiated in response to a press or other such device being turned on. Prior to initiation of the method 70 a variety of tasks may be performed. These tasks include, in no particular order: secure a supply of the ply material 12 within the press; secure a supply of the backing 14 within the press; mount an essentially empty spool downstream of the press; and the like.

At step 72 the ply material 12 and the backing 14 are introduced into the press.

At step 74 sufficient force and/or heat are applied to the ply material 12 and the backing 14 so as to cause the ply material 12 and the backing 14 to adhere.

At step 76 the backed ply material 12 is taken up by the spool. In addition, in response to a sufficient amount of backed ply material 12 being placed upon the spool, the backed ply material 12 is cut, the essentially full spool is removed, and a substantially empty spool is optionally put in its place.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of fabricating an aircraft component, the method comprising the sequential steps of:
   supplying a backed ply material comprising an epoxy resin coated metal foil and a substantially transparent polyester backing film;
   supporting the metal foil on the backing film during the handling of the metal foil;
   tacking the metal foil having the backing film to a tool that corresponds to the aircraft component;
   disposing the metal foil upon the tool along a path;
   inspecting seams between abutting plies of the metal foil after disposing the metal foil upon the tool and prior to removing the backing ply, the metal foil being visible through the polyester backing film; and
   removing the backing film.

2. The method according to claim 1, further comprising:
   cutting the metal foil in response to disposing the metal foil at an end of the path.

3. The method according to claim 1, further comprising:
   recycling the backing film in response to the removing step.

4. The method according to claim 1, wherein the aircraft component comprises a fuselage section.

5. The method according to claim 1, wherein the aircraft component comprises a wing section.

6. The method according to claim 1, wherein the backing film comprises polyethylene terephthalate.

7. The method according to claim 1, wherein the metal foil is titanium foil.

8. The method according to claim 1, further comprising:
   directing heated air onto the metal foil when disposing the metal foil upon the tool.

9. The method according to claim 1, wherein the backing film includes a release agent to facilitate removal of the backing film after the metal foil is disposed upon the tool.

10. A method of generating a composite layup, the method comprising the sequential steps of:
    supplying a backed ply material comprising an epoxy resin coated titanium foil and a substantially transparent polyester backing film;
    supporting the titanium foil on the backing film during the handling of the titanium foil;
    tacking the titanium foil having the backing film to a tool;
    disposing the titanium foil upon the tool along a path;
    inspecting seams between abutting plies of the titanium foil after disposing the titanium foil upon the tool and prior to removing the backing ply, the titanium foil being visible through the polyester backing film; and
    removing the backing film after the titanium foil is disposed upon the tool.

11. The method according to claim 10, further comprising:
    cutting the titanium foil in response to disposing the titanium foil at an end of the path.

12. The method according to claim 10, further comprising:
    recycling the backing film in response to the removing step.

13. The method according to claim 10, wherein the composite layup corresponds to an aircraft component.

\* \* \* \* \*